(12) United States Patent
Koh

(10) Patent No.: US 9,112,190 B2
(45) Date of Patent: Aug. 18, 2015

(54) BATTERY PACK INCLUDING FRAME

(75) Inventor: Seok Koh, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 210 days.

(21) Appl. No.: 12/929,189

(22) Filed: Jan. 6, 2011

(65) Prior Publication Data

US 2011/0300412 A1 Dec. 8, 2011

(30) Foreign Application Priority Data

Jun. 8, 2010 (KR) .................. 10-2010-0053720

(51) Int. Cl.
| | |
|---|---|
| *H01M 2/02* | (2006.01) |
| *H01M 2/04* | (2006.01) |
| *H01M 2/10* | (2006.01) |
| *H01M 2/34* | (2006.01) |
| *H01M 10/42* | (2006.01) |
| *H01M 10/0587* | (2010.01) |

(52) U.S. Cl.
CPC .......... *H01M 2/0215* (2013.01); *H01M 2/0469* (2013.01); *H01M 2/0473* (2013.01); *H01M 2/1061* (2013.01); *H01M 2/34* (2013.01); *H01M 10/425* (2013.01); *H01M 2/0217* (2013.01); *H01M 10/0587* (2013.01)

(58) Field of Classification Search
USPC ......................................................... 429/82
See application file for complete search history.

(56) References Cited

U.S. PATENT DOCUMENTS

| | | | |
|---|---|---|---|
| 4,194,061 A * | 3/1980 | Land et al. ........................ 429/82 |
| 2003/0008208 A1* | 1/2003 | Yamazaki ....................... 429/158 |
| 2005/0130033 A1* | 6/2005 | Iwamura et al. ............... 429/159 |
| 2005/0208346 A1 | 9/2005 | Moon et al. |
| 2006/0266542 A1* | 11/2006 | Yoon .............................. 174/112 |
| 2007/0190407 A1* | 8/2007 | Fujikawa et al. .............. 429/130 |
| 2008/0057383 A1* | 3/2008 | Seo et al. ....................... 429/122 |
| 2008/0096101 A1* | 4/2008 | Kwag et al. ................... 429/121 |
| 2008/0096105 A1* | 4/2008 | Lee et al. ...................... 429/163 |
| 2008/0261087 A1* | 10/2008 | Jang et al. ......................... 429/7 |
| 2009/0081539 A1* | 3/2009 | Koh et al. ...................... 429/178 |
| 2009/0087692 A1* | 4/2009 | Park et al. ......................... 429/7 |

FOREIGN PATENT DOCUMENTS

| | | |
|---|---|---|
| CN | 101170164 A | 4/2008 |
| EP | 1919009 A2 | 5/2008 |
| JP | 2003007282 A | 1/2003 |
| JP | 2006164558 A | 6/2006 |

(Continued)

OTHER PUBLICATIONS

Korean Office Action in KR 10-2010-0053720, dated Jun. 4, 2012 (KOH).

(Continued)

*Primary Examiner* — Maria J Laios
(74) *Attorney, Agent, or Firm* — Lee & Morse, P.C.

(57) ABSTRACT

A battery pack including a bare cell, the bare cell including a first surface, a second surface, a pair of short side surfaces, and a pair of long side surfaces; a circuit module on the first surface of the bare cell, the circuit module being electrically connected to the bare cell; and a frame covering a portion of the bare cell including the circuit module thereon, wherein the frame has a protrusion part at interior portions of side surfaces thereof, the protrusion part being coupled to the short side surfaces of the bare cell.

14 Claims, 9 Drawing Sheets

(56) References Cited

FOREIGN PATENT DOCUMENTS

| | | |
|---|---|---|
| JP | 2007-073203 A | 3/2007 |
| JP | 2007-522635 A | 8/2007 |
| JP | 2008-147090 A | 6/2008 |
| KR | 10-0770106 B1 | 10/2007 |
| KR | 10-0835743 B1 | 5/2008 |
| KR | 10-0876266 B1 | 12/2008 |
| KR | 10 2009-0031159 A | 3/2009 |

OTHER PUBLICATIONS

JP Office Action dated Oct. 30, 2012.

* cited by examiner

BATTERY PACK INCLUDING FRAME

BACKGROUND

1. Field

Embodiments relate to a battery pack.

2. Description of the Related Art

Generally, secondary batteries may be used as power sources of portable wireless devices, e.g., cellular phones, portable computers, video cameras, or the like. The secondary batteries may be repeatedly charged and may be implemented as small-sized, large-capacity batteries. Accordingly, secondary batteries are widely used in advanced electronic devices because they have a high operating voltage and high energy density per unit weight.

The secondary battery may include a bare cell including an electrode assembly having a positive electrode plate, a negative electrode plate, and a separator, a can accommodating the electrode, and a cap assembly sealing an upper end of the can. A battery pack may be formed by mounting a protection circuit module in the bare cell and accommodating the resultant product in a separate frame, followed by labeling.

SUMMARY

Embodiments are directed to a battery pack, which represents advances over the related art.

At least one of the above and other features and advantages may be realized by providing a battery pack including a bare cell, the bare cell including a first surface, a second surface, a pair of short side surfaces, and a pair of long side surfaces; a circuit module on the first surface of the bare cell, the circuit module being electrically connected to the bare cell; and a frame covering a portion of the bare cell including the circuit module thereon, wherein the frame has a protrusion part at interior portions of side surfaces thereof, the protrusion part being coupled to the short side surfaces of the bare cell.

The frame may include a front surface corresponding to the first surface of the bare cell; a pair of side surfaces corresponding to the pair of short side surfaces of the bare cell; and extending surfaces extending from edges of the front surface and the pair of side surfaces to long side surfaces of the bare cell, wherein the frame is an all-in-one type in which the front surface, the pair of side surfaces and the extending surfaces are integrally formed.

The frame may cover the first surface and the pair of short surfaces of the bare cell.

The side surfaces of the frame may include a first side surface corresponding to one short side surface of the bare cell, the first side surface including a first protrusion part at an interior bottom thereof; and a second side surface corresponding to another short side surface of the bare cell, the second side surface including a second protrusion part at an interior bottom thereof.

The first protrusion part may have a gas release hole therein.

The first protrusion part may have a gas exhaust groove therein.

A thickness of the first protrusion part may be greater than a thickness of the second protrusion part.

The frame may include a front surface corresponding to the first surface of the bare cell; a pair of side surfaces corresponding to the pair of short side surfaces of the bare cell; a rear surface corresponding to the second surface of the bare cell; and extending surfaces extending from edges of the front surface, the pair of side surfaces, and the rear surface to long side surfaces of the bare cell, wherein the frame is an all-in-one type in which the front surface, the pair of side surfaces, the rear surface, and the extending surfaces are integrally formed.

The frame may cover the first surface, the pair of short side surfaces, and the second surface of the bare cell.

The frame may include a front surface corresponding to the first surface of the bare cell; a side surface corresponding to one of the pair of short side surfaces of the bare cell; and extending surfaces extending from edges of the front surface and the side surface to long side surfaces of the bare cell, wherein the frame is an all-in-one type in which the front surface, the side surface, and the extending surfaces are integrally formed.

The frame may cover the first surface and the one short side surface of the bare cell.

The battery pack may further include a side surface frame corresponding to another short side surface of the bare cell, the side surface frame being coupled to the frame.

The side surface frame may include a third protrusion part at an interior bottom thereof.

The side surface frame may include an additional extending surface thereon toward the pair of long side surfaces of the bare cell.

The circuit module may include a printed circuit board having a plate shape; an external terminal in the printed circuit board, the external terminal being outwardly exposed; and a lead tab electrically connected to an electrode terminal of the bare cell.

The lead tab may include a first lead tab electrically connected to the electrode terminal of the bare cell; and a second lead tab electrically connected to one of the short side surfaces of the bare cell.

The battery pack may further include an insulating adhesion member attached to the first surface and one of the short side surfaces of the bare cell, the insulating adhesion member being configured to prevent a short circuit between the bare cell and the circuit module.

The battery pack may further include a label attached to the pair of long side surfaces and the second surface of the bare cell.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
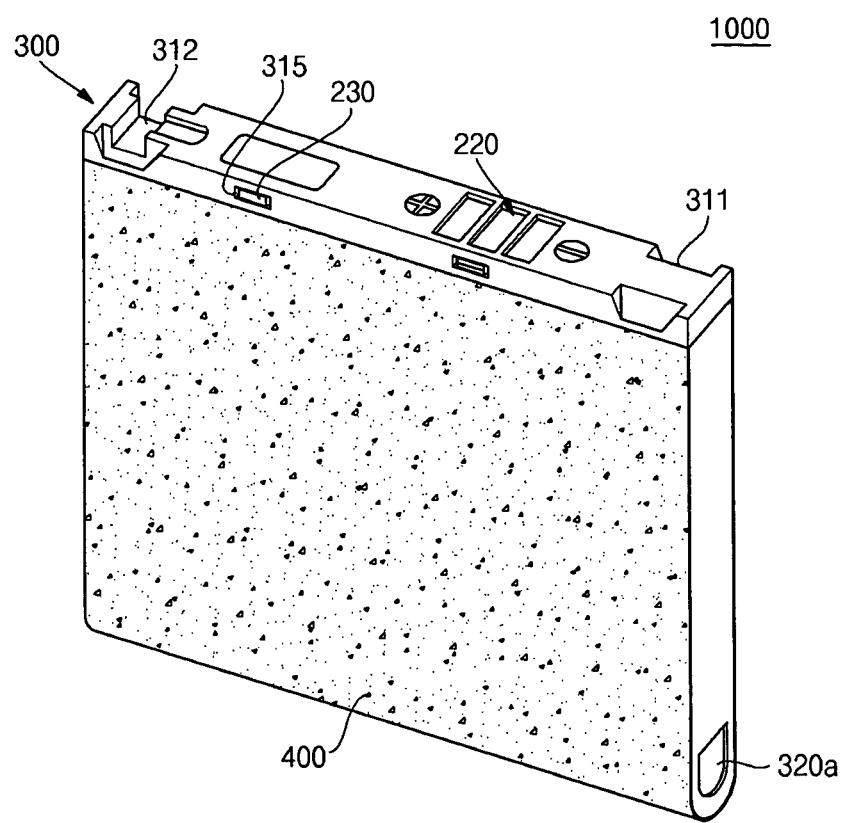
FIG. 1 illustrates a perspective view of a battery pack according to an embodiment.

Korean Patent Application No. 10-2010-0053720, filed on Jun. 8, 2010, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
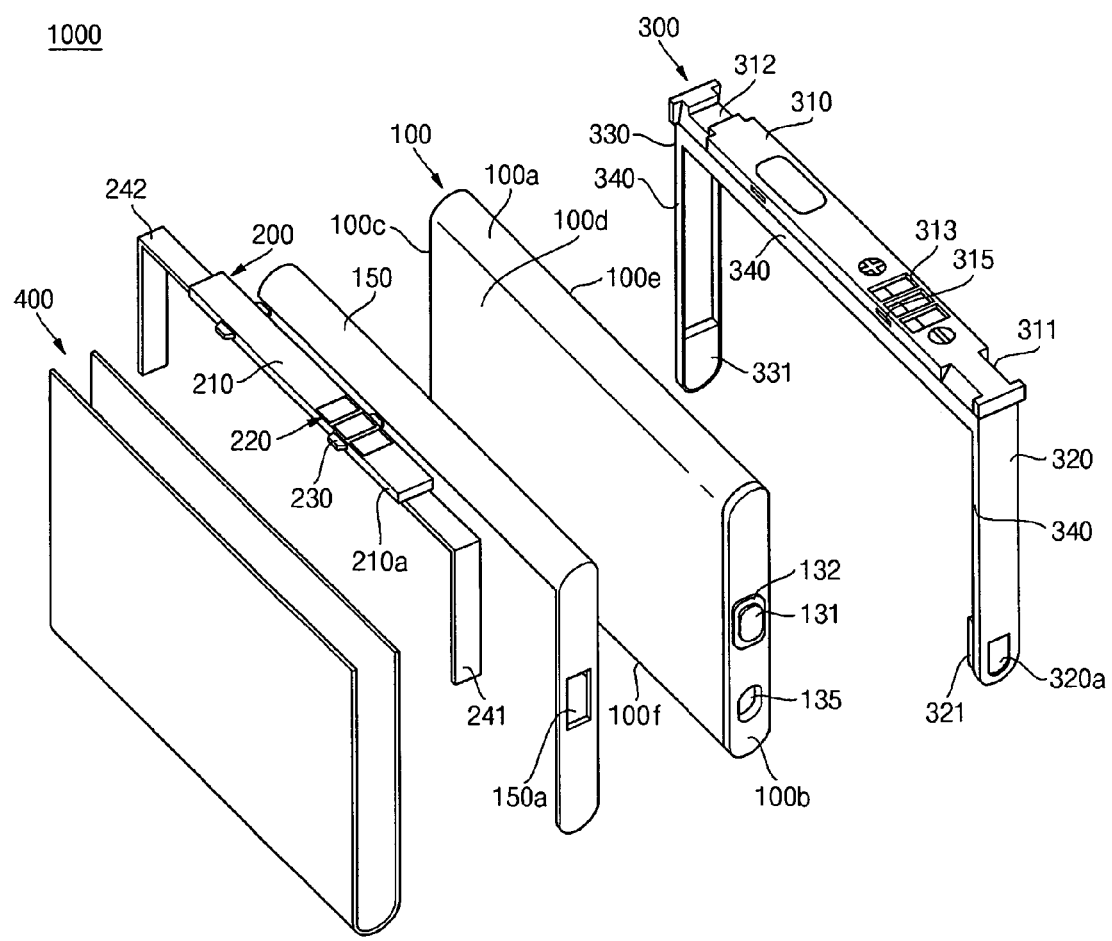
FIG. 2 illustrates an exploded perspective view of the battery pack shown in FIG. 1.
Figure 3:
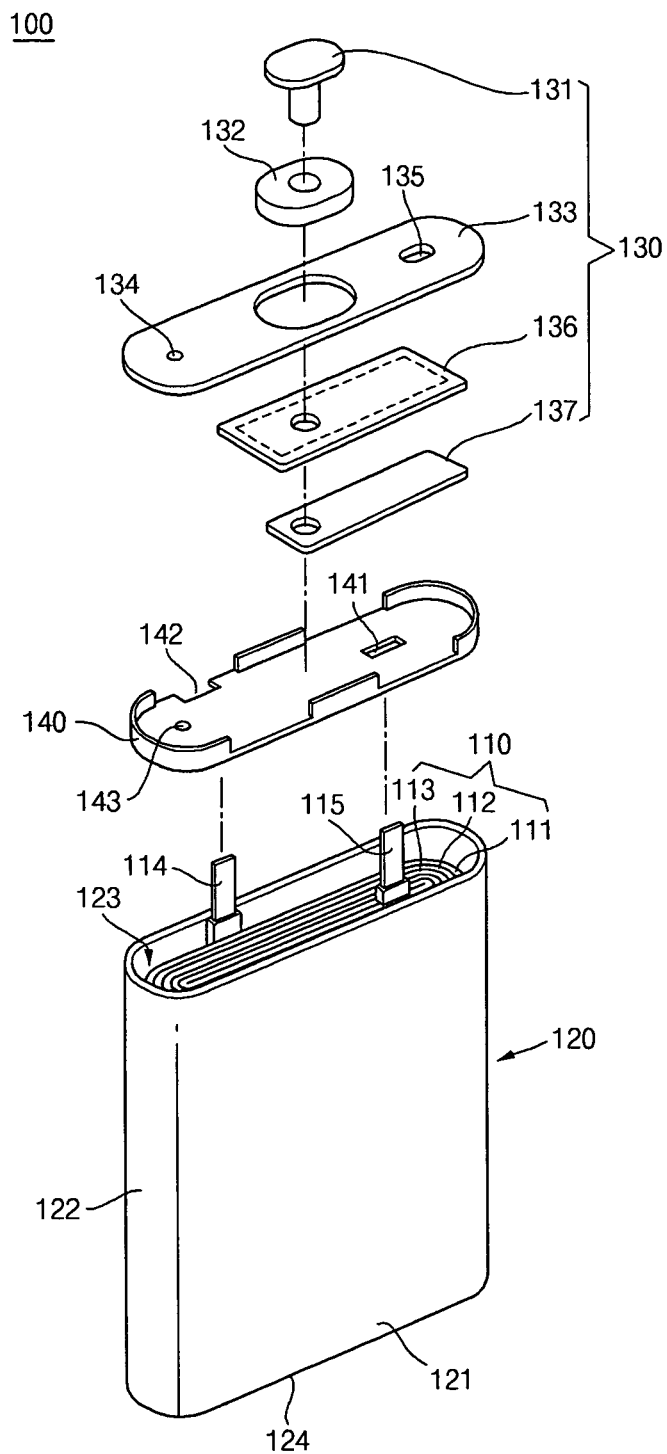
FIG. 3 illustrates an exploded perspective view of a bare cell shown in FIG. 2.
Figure 4:
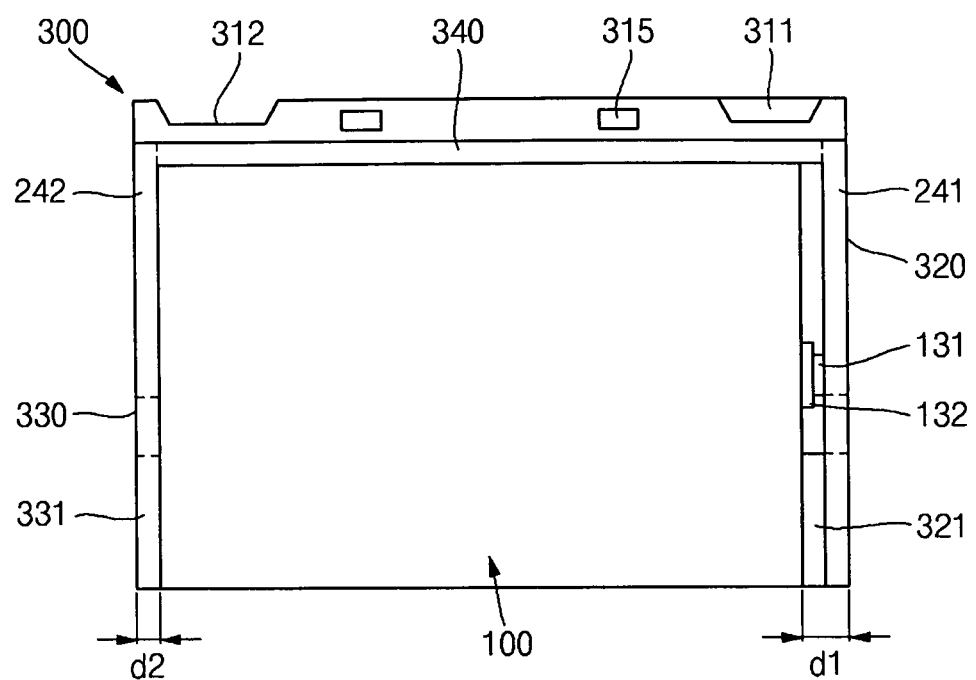
FIG. 4 illustrates a front view of a state in which a bare cell, a circuit module, and a frame are assembled in the battery pack shown in FIG. 2.
Figure 5A:
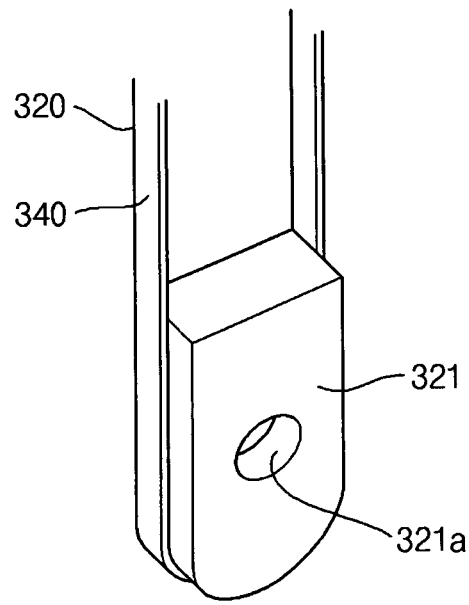
FIGS. 5A and 5B illustrate perspective views of a first protrusion part shown in FIG. 2.
Figure 5B:
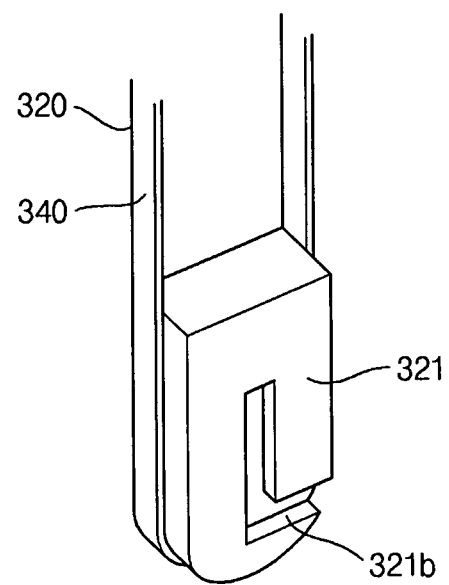

FIG. 1 illustrates a perspective view of a battery pack according to an embodiment. FIG. 2 illustrates an exploded perspective view of the battery pack shown in FIG. 1. FIG. 3 illustrates an exploded perspective view of a bare cell shown in FIG. 2. FIG. 4 illustrates a front view of a state in which a bare cell, a circuit module, and a frame are assembled in the battery pack shown in FIG. 2. FIGS. 5A and 5B illustrate perspective views of a first protrusion part shown in FIG. 2.

Referring to FIGS. 1 through 4, the battery pack 1000 according to the present embodiment may include a bare cell 100, a circuit module 200, a frame 300, and a label 400.

The bare cell 100 and the circuit module 200 may be electrically connected to each other to form a core pack. The frame 300 may be assembled to the core pack, followed by attaching a label 400 to the resulting assembly, thereby completing the battery pack 1000.

Referring first to FIG. 3, the battery cell 300 included in the core pack may include an electrode assembly 110, a can 120, a cap assembly 130, and an insulation case 140. The bare cell 100 may further include an insulating adhesion member 150.

The bare cell 100 may be formed by accommodating the electrode assembly 110 including a positive electrode plate 111, a negative electrode plate 113, and a separator 112 in the can 120 together with an electrolyte, and sealing an upper end opening 123 of the can 120 by the cap assembly 130. When viewed from an external side, as shown in FIG. 2, the bare cell 100 may include a first surface 100a, a pair of short side surface 100b and 100c, a pair of long side surface 100d and 100e, and a second surface 100f. Here, the pair of short side surface 100b and 100c of the bare cell 100 may be side surfaces having a relatively small width among the side surfaces 100b, 100c, 100d, and 100e of the bare cell 100, while the pair of long side surface 100d and 100e of the bare cell 100 may be side surfaces having a relatively large width.

The electrode assembly 110 may be formed by stacking and winding the positive electrode plate 111, the negative electrode plate 113, and the separator 112 disposed therebetween. The positive electrode plate 111 may include a positive electrode tab 114 and the negative electrode plate 113 may include a negative electrode tab 115. The separator 112 may insulate the positive electrode plate 111 and the negative electrode plate 113 from each other and may be formed of a porous film so as to allow an electrolyte to pass.

The can 120, including a pair of long side surfaces 121, a pair of short side surfaces 122, and a bottom surface 124, may have a substantially box shape, and an upper portion of the can 120 may be open, thus forming an upper end opening 123. Here, the long side surfaces 121 of the can 120 may correspond to the long side surfaces 100d and 100e of the bare cell 100, the short side surfaces 122 of the can 120 may correspond to the first surface 100a and the second surface 100f of the bare cell 100, and the bottom surface 124 of the can 120 may corresponds to the short surface 100c of the bare cell 100. The upper end opening 123 may be a portion into which the electrode assembly 110 is inserted. The upper portion of the can 120 may be sealed by the cap assembly 130, thereby preventing leakage of the electrolyte. The can 120 may be made of, e.g., a light-weight and ductile metal, such as aluminum or an aluminum alloy. In an implementation, the can 120 may be formed by, e.g., a deep drawing process, and the long side surfaces 121, the short side surfaces 122, and the bottom surface 124 of the can 120 may be integrally formed.

The cap assembly 130 may include an electrode terminal 131, a cap plate 133, an insulation plate 136, and a terminal plate 137. A gasket tube 132 may be inserted between the cap plate 133 and the electrode terminal 132, and the electrode terminal 131 and the terminal plate 137 may be electrically connected to each other. The cap plate 133 and the electrode terminal 131 may be short side surfaces 100b of the bare cell 100. The insulation plate 136 may insulate the cap plate 133 and the terminal plate 137 from each other. An electrolyte injection hole 134 may be formed at one side of the cap plate 133. A plug (not shown) may be provided for sealing the electrolyte injection hole 134 once an electrolyte is injected into the electrolyte injection hole 134. A safety vent 135 may be formed at the other side of the cap plate 133. The safety vent 135 may have a thickness smaller than that of the cap plate 133. The safety vent 135 may be opened to release internal gases when an internal pressure of the can 120 exceeds an operating pressure of the safety vent 135.

The insulation case 140 may be formed at the upper end opening 123 of the can 120 and may insulate the electrode assembly 110 and the cap assembly 130 from each other. The insulation case 140 may be made of, e.g., polypropylene, which is an insulating polymer resin. A hole 141 for a negative electrode tab may be formed at one side of the insulation case 140 to allow the negative electrode tab 115 to pass and a hole 142 for a positive electrode tab may be formed at another side of the insulation case 140 to allow the positive electrode tab 114 to pass. Additionally, an electrolyte passing hole 143 may be formed at a location corresponding to the electrolyte injection hole 134 in the insulation case 140.

The insulating adhesion member 150 may be attached to the first surface 100a and one short side surface 100b of the bare cell 100 to prevent a short circuit between the bare cell 100 and the circuit module 200. The insulating adhesion member 150 may include a hole 150a at a region corresponding to the electrode terminal 131, thus exposing the electrode terminal 131 protruding from the one short side surface 100b of the bare cell 100. The insulating adhesion member 150 may be an insulation tape having an insulating capability and may be capable of being adhered to the bare cell 100.

Referring to FIG. 2, the circuit module 200 may include a printed circuit board 210, an external terminal 220, a coupling protrusion 230, and lead tabs 241 and 242.

The printed circuit board 210 may be made of a plate-shaped resin. The printed circuit board 210 may include circuits for controlling charging and discharging operation of a battery. In order to implement such circuits, the printed circuit board 210 may include circuit elements (not shown).

In order to connect the circuit module 200 to an external electronic device (not shown), the external terminal 220 may be installed in the printed circuit board 210 and exposed outwardly.

The coupling protrusion 230 may be formed at an outer side surface 210a of the printed circuit board 210. The coupling protrusion 230 may facilitate physically connecting the circuit module 200 and the frame 300 to each other and may be fixedly inserted into a coupling hole 315 in the frame 300. The coupling protrusion 230 may be integrally formed with the printed circuit board 210. Such a formation may help prevent the coupling protrusion 230 from separating from the printed circuit board 210 in the event of, e.g., a shock generated when the coupling protrusion 230 is inserted into the coupling hole 315 formed in the frame 300.

The lead tabs 241 and 242 may be coupled to a connection terminal (not shown) on a bottom surface of the printed circuit board 210. The lead tabs 241 and 242 may electrically connect the printed circuit board 210 to the bare cell 100. The lead tabs 241 and 242 may include a first lead tab 241 connected to the electrode terminal 131 of the bare cell 100 and a second lead tab 242 connected to another short side surface 100c of the bare cell 100. In the present embodiment, the electrode terminal 131 may function as a negative electrode and the other short side surface 100c of the bare cell 100 may function as a positive electrode, i.e., having a polarity opposite to that of the electrode terminal 131. Thus, the first lead tab 241 connected to the electrode terminal 131 may correspond to a negative electrode terminal and the second lead tab 242 connected to the other short side surface 100c may correspond to a positive electrode terminal. Of course, the electrode terminal 131 and the other short side surface 100c of the bare cell 100 may have opposite polarities.

The first lead tab 241 and the second lead tab 242 may be bent in a substantially 'L' shape. One side of the first lead tab 241 may be connected to the electrode terminal 131 and insulated from the one short side surface 100b of the bare cell 100. Another side of the first lead tab 241 may be connected to a connection terminal in the printed circuit board 210 and insulated from the first surface 100a of the bare cell 100. One side of the second lead tab 242 may connected to the other short side surface 100c of the bare cell 100. Another side of the second lead tab 242 may be connected to another connection terminal in the printed circuit board 210 and insulated from the first surface 100a of the bare cell 100. The first lead tab 241 and the second lead tab 242 may be made of a conductive material, e.g., nickel or a nickel alloy, to facilitate formation of an electrical connection between the bare cell 100 and the circuit module 200.

The frame 300 may include a front surface 310, a pair of side surfaces 320 and 330, and extending surfaces 340. The frame 300 may be formed as an all-in-one type or single piece, i.e., one piece, using, e.g., injection molding, to cover the first surface 100a and the pair of short side surfaces 100b and 100c of the bare cell 100 on which the circuit module 200 is disposed. The frame 300 may be assembled to the circuit module 200 connected to the bare cell 100. Here, the circuit module 200 and the frame 300 may be physically connected by the coupling protrusion 230 in the circuit module 200 and the coupling hole 315 in the frame 300.

The front surface 310 may have a size corresponding to a size of the first surface 100a of the bare cell 100 on which the circuit module 200 is disposed. The front surface 310 may cover the first surface 100a of the bare cell 100 when the front surface 310 is coupled to the circuit module 200. The front surface 310 may include an opening 313 at a location corresponding to the external terminal 220 of the circuit module 200 and thus may expose the external terminal 220.

A locker 311 extending through the front surface 310 and the extending surface 340 may be formed at one side of the front surface 310. A hook 312 extending through the front surface 310 and the extending surface 340 may be formed at another side of the front surface 310. The locker 311 and the hook 312 may be provided to facilitate insertion of the battery pack 1000 into an external device in a proper direction.

The pair of side surfaces 320 and 330 may be connected to the front surface 310 and may have sizes corresponding to sizes of the pair of short side surfaces 100b and 100c of the bare cell 100. The pair of side surfaces 320 and 330 may cover the pair of short side surface 100b and 100c of the bare cell 100 when they are coupled to the circuit module 200. The side surfaces 320 and 330 may include a first side surface 320 connected to one short side surface 100b of the bare cell 100 and a second side surface 330 connected to the other short side surface 100c of the bare cell 100.

A handle 320a of an engraved type may be formed at an exterior bottom of the first side surface 320 and may facilitate an easy disconnection of the battery pack 1000 from the external device. A first protrusion part 321 may be formed in an interior bottom of the first side surface 320. The first protrusion part 321 may be coupled to the one short side surface 100b of the bare cell 100. In addition, the first protrusion part 321 may be coupled to a portion of the one short side surface 100b where the safety vent 135 is formed.

Referring to FIG. 4, a thickness d1 of the first protrusion part 321 may be about the same as a sum of thicknesses of the electrode terminal 131 of the bare cell 100 and a thickness of the first lead tab 241, thereby eliminating a gap between the bare cell 100 and the frame 300.

A second protrusion part 331 may be formed in an interior bottom of the second side surface 330. The second protrusion part 331 may be coupled to the other short side surface 100c of the bare cell 100. A thickness d2 of the second protrusion part 331 may be the same as a thickness of the second lead tab 242, thereby eliminating a gap between the bare cell 100 and the frame 300. In an implementation, the thickness d1 of the first protrusion part 321 may be greater than the thickness d2 of the second protrusion part 331, e.g., d1>d2.

In other words, the first protrusion part 321 and the second protrusion part 331 may facilitate tight coupling of the frame 300 and the bare cell 100 to each other without a gap therebetween, thereby increasing a coupling force between the frame 300 and the bare cell 100.

Referring to FIGS. 5A and 5B, a gas exhaust path may be formed in the first protrusion part 321. The gas exhaust path may include a hole or a groove to release gases generated in the bare cell 100.

As shown in FIG. 5A, the first protrusion part 321 may have a gas release hole 321a formed therein. The gas release hole 321a may pass through the first protrusion part 321. In particular, the gas release hole 321a may be formed at a location corresponding to the safety vent 135 in the bare cell 100. The gas release hole 321a may exhaust gas released through the safety vent 135 to the outside. In addition, the first side surface 320 may have a through-hole (not shown) at a location corresponding to the gas release hole 321a. As illustrated in FIG. 5A, the gas release hole 321a may have a circular shape, but the embodiments are not limited thereto. For example, the gas release hole 321a may have a triangular shape, a rectangular shape, or other polygonal shapes.

As illustrated in FIG. 5B, the first protrusion part 321 may also include a gas exhaust groove 321b. The gas exhaust groove 321b may form a gas exhaust path; and a portion of the gas exhaust groove 321b may correspond to the safety vent 135 formed in the bare cell 100. Thus, gas released through the safety vent 135 may be exhausted to the outside through the gas exhaust groove 321b.

The extending surface 340 may extend from edges of the front surface 310 and the pair of side surfaces 320 and 330 toward the pair of long side surface 100d and 100e of the bare cell 100. The extending surface 340 may cover portions of the pair of long side surface 100d and 100e of the bare cell 100 when the bare cell 100 is coupled to the circuit module 200 connected thereto. The coupling hole 315 may be formed in the extending surface 340; and the coupling protrusion 230 in the circuit module 200 may be inserted into the coupling hole 315. The coupling hole 315 may have a size the same as or slightly smaller than the coupling protrusion 230 to facilitate prevention of the coupling protrusion 230 in the circuit module 200 from being readily disengaged from the coupling hole 315 once the coupling protrusion 230 is inserted into the coupling hole 315.

After the circuit module 200 connected to the bare cell 100 is covered by the frame 300, the label 400 may be adhered so as to cover the pair of long side surface 100d and 100e and the second surface 100f of the bare cell 100. In such a manner, the label 400 may increase a coupling force between the bare cell 100, the circuit module 200, and the frame 300, while protecting the completed battery pack 1000 from external shocks.

As described above, since the battery pack 1000 according to the present embodiment may include the frame 300 having the protrusion parts 321 and 331, a coupling force between the frame 300 and a core pack including the bare cell 100 and the circuit module 200 connected to each other may be increased.

A battery pack according to another embodiment will now be described.

Figure 6:
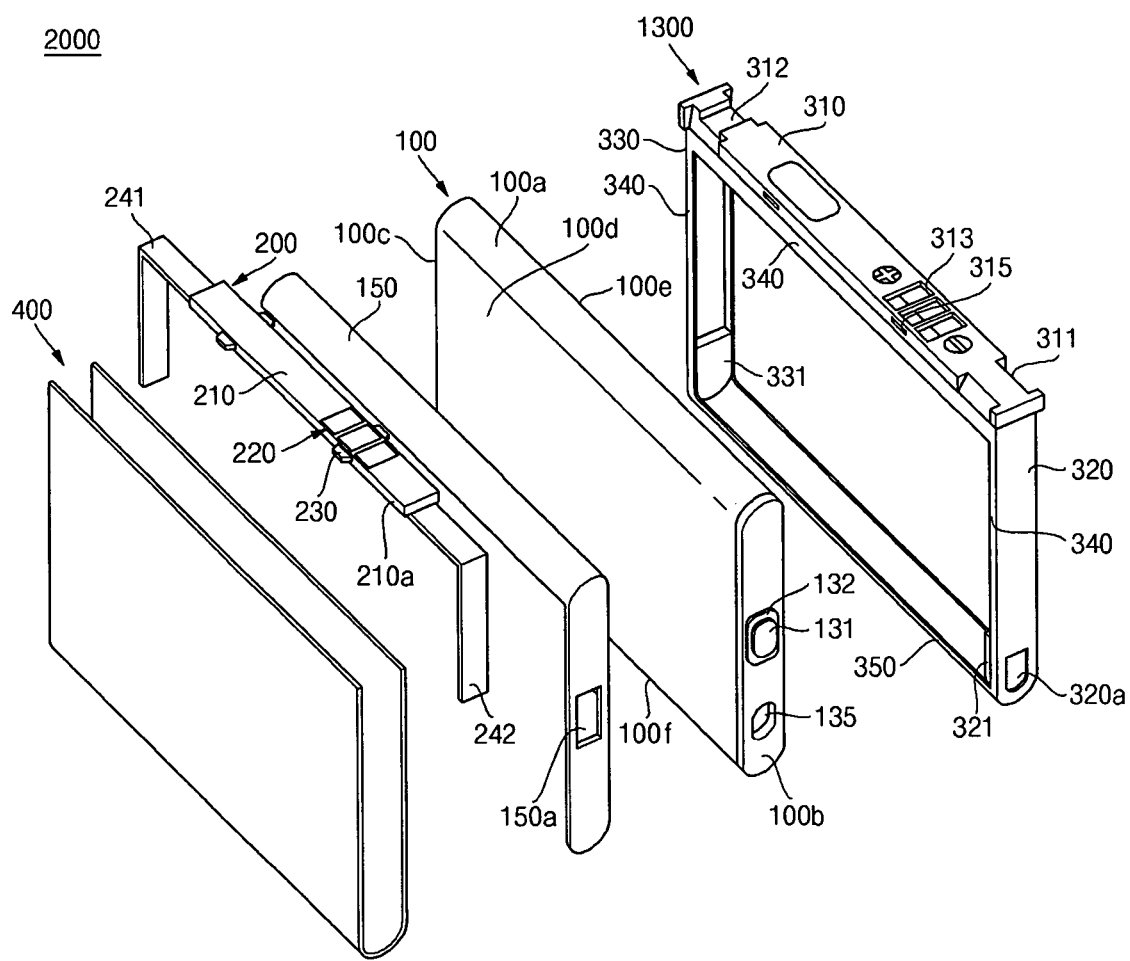
FIG. 6 illustrates an exploded perspective view of a battery pack according to another embodiment.
Figure 7:
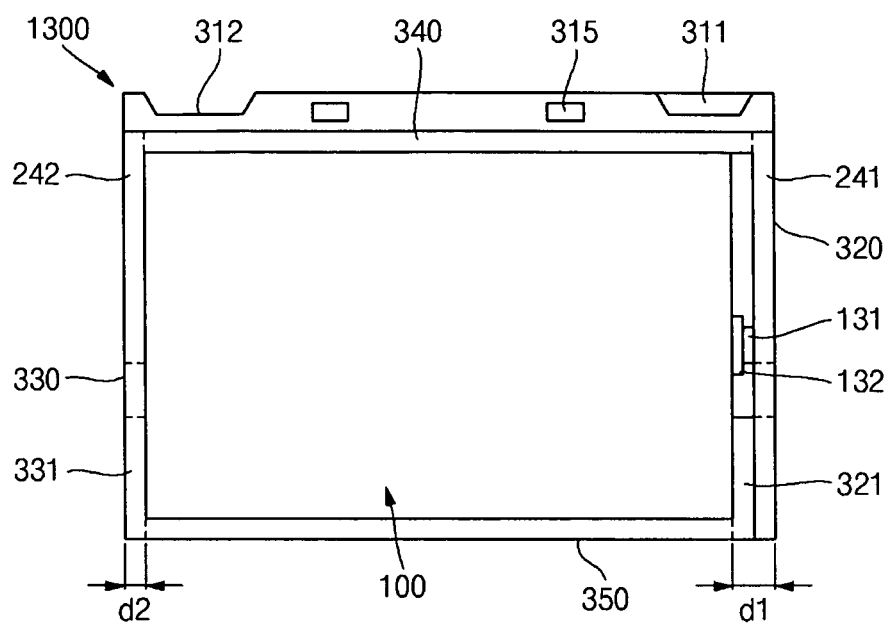
FIG. 7 illustrates a front view of a state in which a bare cell, a circuit module, and a frame are assembled in the battery pack shown in FIG. 6.

FIG. 6 illustrates an exploded perspective view of a battery pack according to another embodiment. FIG. 7 illustrates a front view of a state in which a bare cell, a circuit module, and a frame are assembled in the battery pack shown in FIG. 6.

The battery pack according to the present embodiment is substantially the same as the battery pack shown in FIGS. 2 and 4, and only differences therebetween will be described herein.

Referring to FIGS. 6 and 7, the battery pack 2000 according to the present embodiment may include a bare cell 100, a circuit module 200, a frame 1300, and a label 400.

The frame 1300 may include a front surface 310, a pair of side surfaces 320 and 330, extending surfaces 340, and a rear surface 350. The frame 1300 may be formed in an all-in-one type or single piece using, e.g., injection molding, to cover the first surface 100a, the pair of short side surface 100b and 100c and the second surface 100f of the bare cell 100 including the circuit module 200 coupled thereto. The frame 1300 may be assembled to the circuit module 200 connected to the bare cell 100.

The extending surfaces 340 may extend from edges of the front surface 310, the pair of side surfaces 320 and 330, and the rear surface 350 to the pair of long side surface 100d and 100e of the bare cell 100. The extending surfaces 340 may cover portions of the pair of long side surface 100d and 100e of the bare cell 100 when the bare cell 100 is coupled to the circuit module 200 connected thereto.

The rear surface 350 may be connected to the pair of side surfaces 320 and 330 and may have a size corresponding to a size of the second surface 100f of the bare cell 100 and may cover the second surface 100f of the bare cell 100 when the bare cell 100 is coupled to the circuit module 200 connected thereto.

A battery pack according to yet another embodiment will now be described.

Figure 8:
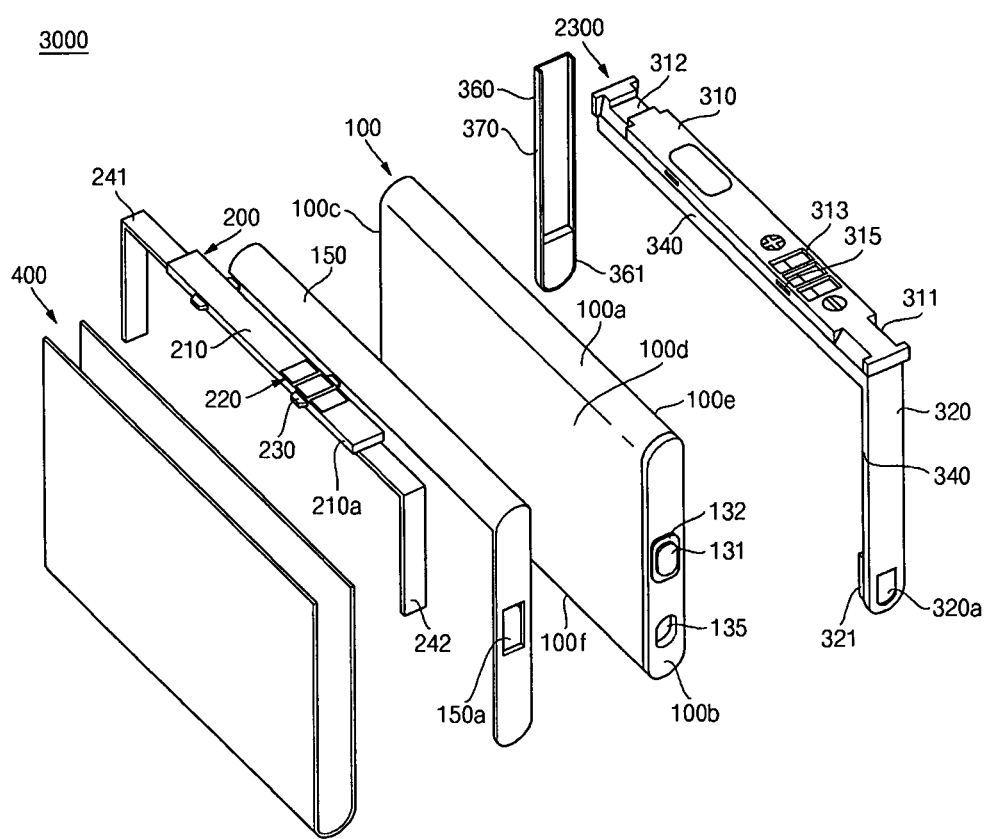
FIG. 8 illustrates an exploded perspective view of a battery pack according to yet another embodiment.
Figure 9:
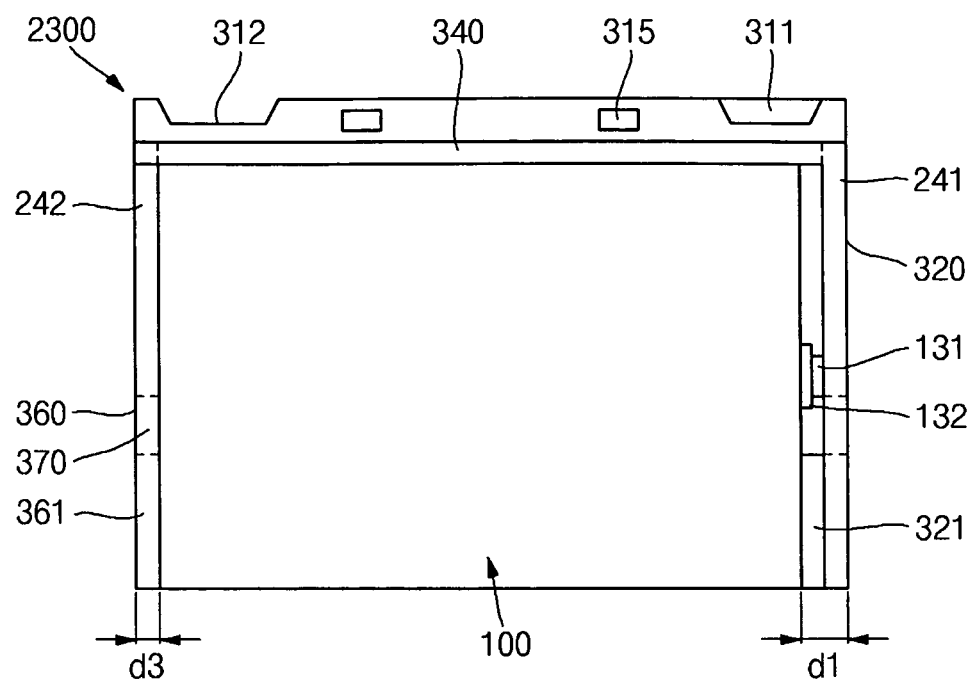
FIG. 9 illustrates a front view of a state in which a bare cell, a circuit module, and a frame are assembled in the battery pack shown in FIG. 8.

FIG. 8 illustrates an exploded perspective view of a battery pack according to yet another embodiment. FIG. 9 illustrates a front view of a state in which a bare cell, a circuit module, and a frame are assembled in the battery pack shown in FIG. 8.

The battery pack according to the present embodiment is substantially the same as the battery pack shown in FIGS. 2 and 4, and only differences therebetween will be described herein.

Referring to FIGS. 8 and 9, the battery pack 3000 according to the present embodiment may include a bare cell 100, a circuit module 200, a frame 2300, and a label 400.

The frame 2300 may include a front surface 310, a side surface 320, and an extending surface 340. In addition, the frame 2300 may include a separate additional side surface 360. The frame 2300 may cover the first surface 100a and a pair of short side surfaces 100b and 100c of the bare cell 100 in which the circuit module 200 is disposed. The frame 2300 may be formed in an all-in-one type in which the front surface 310, the side surface 320, and the extending surface 340 are integrally formed; and the additional side surface 360 may be coupled to the frame 2300.

The additional side surface 360 may have a shape corresponding to a shape of the side surface 320 of the previous embodiment and may cover the other short side surface 100c of the bare cell 100. An additional extending surface 370 may extend from the additional side surface 360 coupled to the extending surface 340 to the pair of long side surface 100d and 100e of the bare cell 100. The additional extending surface 370 may cover portions of pair of long side surface 100d and 100e of the bare cell 100.

In addition, a third protrusion part 361 may be formed in an interior bottom of the additional side surface 360. The third protrusion part 361 may be coupled to the other short side surface 100c of the bare cell 100. The third protrusion part 361 may have a thickness d3 that is about the same as a thickness of the second lead tab 242, thereby eliminating a gap between the bare cell 100 and the frame 2300. In an implementation, the thickness d3 of the third protrusion part 361 may be smaller than a thickness d1 of the first protrusion part 331, e.g., d3<d1.

According to the embodiments, when the frame and a core pack including a bare cell and a protection circuit module are coupled to each other, an undesirable gap between the frame and the core pack may be prevented.

The embodiments provide a battery pack capable of increasing a coupling force between a core pack and a frame, the core pack including of a bare cell and a circuit module.

Exemplary embodiments of a battery pack have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A battery pack, comprising:
   a bare cell, the bare cell including a terminal, a first surface, a second surface facing the first surface, a pair of short side surfaces including a first short side surface and a second short side surface, and a pair of long side surfaces;
a circuit module on the first surface of the bare cell, the circuit module being electrically connected to the bare cell, wherein the circuit module includes a lead tab; and
a frame covering a portion of the bare cell including the circuit module thereon,
wherein:
the frame includes a protrusion part at an end of an interior portion of at least one side surface thereof,
the protrusion part directly contacts one of the pair of short side surfaces of the bare cell,
the protrusion part has a width equivalent to a width of the one of the pair of short side surfaces,
the protrusion part is located adjacent to the second surface of the bare cell,
the one side surface of the frame covers the one of the pair of short side surfaces of the bare cell,
the protrusion part has a thickness that is about equal to the sum of a thickness of the terminal and a thickness of the lead tab,
the protrusion part includes a gas release hole or a gas exhaust groove therein, and
the one of the pair of short side surfaces of the bare cell includes a safety vent, the gas release hole or the gas exhaust groove being formed at a location corresponding to the safety vent;
wherein the frame includes:
a front surface corresponding to the first surface of the bare cell;
a pair of side surfaces corresponding to the pair of short side surfaces of the bare cell; and
extending surfaces extending from edges of the front surface and the pair of side surfaces to long side surfaces of the bare cell,
wherein the frame is an all-in-one type in which the front surface, the pair of side surfaces, and the extending surfaces are integrally formed;
wherein the side surfaces of the frame include:
a first side surface corresponding to the first short side surface of the bare cell, the first side surface of the frame including a first protrusion part at an end of an interior portion thereof, the first protrusion part directly contacting the first short side surface of the bare cell and having a width equivalent to a width of the first short side surface; and
a second side surface corresponding to the second short side surface of the bare cell, the second side surface of the frame including a second protrusion part an end of an interior portion thereof, the second protrusion part directly contacting the second short side surface of the bare cell and having a width equivalent to a width of the second short side surface; and
wherein a thickness of the first protrusion part is greater than a thickness of the second protrusion part.

2. The battery pack as claimed in claim 1, wherein the frame covers the first surface and the first short side surface of the bare cell.

3. The battery pack as claimed in claim 1, wherein the second side surface is coupled to the frame.

4. The battery pack as claimed in claim 1, wherein the second side surface includes an additional extending surface thereon toward the pair of long side surfaces of the bare cell.

5. The battery pack as claimed in claim 1, wherein the circuit module includes:
a printed circuit board having a plate shape;
an external terminal in the printed circuit board, the external terminal being outwardly exposed; and
a lead tab electrically connected to an electrode terminal of the bare cell.

6. The battery pack as claimed in claim 5, wherein the lead tab includes:
a first lead tab electrically connected to the electrode terminal of the bare cell; and
a second lead tab electrically connected to one of the short side surfaces of the bare cell.

7. The battery pack as claimed in claim 1, further comprising an insulating adhesion member attached to the first surface and one of the short side surfaces of the bare cell, the insulating adhesion member being configured to prevent a short circuit between the bare cell and the circuit module.

8. The battery pack as claimed in claim 1, further comprising a label attached to the pair of long side surfaces and the second surface of the bare cell.

9. The battery pack as claimed in claim 1, wherein:
the protrusion part has a flat surface directly contacting the one of the pair of short side surfaces, the flat surface of the protrusion part having a width equivalent to a width of the one of the pair of short side surfaces.

10. A battery pack, comprising:
a bare cell, the bare cell including a terminal, a first surface, a second surface facing the first surface, a pair of short side surfaces including a first short side surface and a second short side surface, and a pair of long side surfaces;
a circuit module on the first surface of the bare cell, the circuit module being electrically connected to the bare cell, wherein the circuit module includes a lead tab; and
a frame covering a portion of the bare cell including the circuit module thereon,
wherein:
the frame includes a protrusion part at an end of an interior portion of at least one side surface thereof,
the protrusion part directly contacts one of the pair of short side surfaces of the bare cell,
the protrusion part has a width equivalent to a width of the one of the pair of short side surfaces,
the protrusion part is located adjacent to the second surface of the bare cell,
the one side surface of the frame covers the one of the pair of short side surfaces of the bare cell,
the protrusion part has a thickness that is about equal to the sum of a thickness of the terminal and a thickness of the lead tab,
the protrusion part includes a gas release hole or a gas exhaust groove therein, and
the one of the pair of short side surfaces of the bare cell includes a safety vent, the gas release hole or the gas exhaust groove being formed at a location corresponding to the safety vent;
wherein the frame includes:
a front surface corresponding to the first surface of the bare cell;
a pair of side surfaces corresponding to the pair of short side surfaces of the bare cell, the pair of side surfaces including:
a first side surface corresponding to the first short side surface of the bare cell, the first side surface of the frame including a first protrusion part at an end of an interior portion thereof, the first protrusion part directly contacting the first short side surface of the bare cell and having a width equivalent to a width of the first short side surface; and a second side surface corresponding to the second short side surface of the bare cell, the second side surface of the frame including a second protrusion part an end of an interior portion thereof, the second protrusion part directly contacting the second short side surface and having a width equivalent to a width of the second short side surface;

a rear surface corresponding to the second surface of the bare cell; and extending surfaces extending from edges of the front surface, the pair of side surfaces, and the rear surface to long side surfaces of the bare cell, wherein the frame is an all-in-one type in which the front surface, the pair of side surfaces, the rear surface, and the extending surfaces are integrally formed.

11. The battery pack as claimed in claim 10, wherein the frame covers the first surface and the pair of short side surfaces of the bare cell.

12. The battery pack as claimed in claim 10, wherein a thickness of the first protrusion part is greater than a thickness of the second protrusion part.

13. The battery pack as claimed in claim 10, wherein the frame covers the first surface, the pair of short side surfaces, and the second surface of the bare cell.

14. The battery pack, comprising:
a bare cell, the bare cell including a terminal, a first surface, a second surface facing the first surface, a pair of short side surfaces including a first short side surface and a second short side surface, and a pair of long side surfaces;
a circuit module on the first surface of the bare cell, the circuit module being electrically connected to the bare cell, wherein the circuit module includes a lead tab; and
a frame covering a portion of the bare cell including the circuit module thereon,
wherein:
the frame includes a protrusion part at an end of an interior portion of at least one side surface thereof,
the protrusion part directly contacts one of the pair of short side surfaces of the bare cell,
the protrusion part has a width equivalent to a width of the one of the pair of short side surfaces,
the protrusion part is located adjacent to the second surface of the bare cell,
the one side surface of the frame covers the one of the pair of short side surfaces of the bare cell,
the protrusion part has a thickness that is about equal to the sum of a thickness of the terminal and a thickness of the lead tab,
the protrusion part includes a gas release hole or a gas exhaust groove therein, and
the one of the pair of short side surfaces of the bare cell includes a safety vent, the gas release hole or the gas exhaust groove being formed at a location corresponding to the safety vent;

wherein the frame includes:

a front surface corresponding to the first surface of the bare cell;

a pair of side surfaces corresponding to the pair of short side surfaces of the bare cell; and extending surfaces extending from edges of the front surface and the pair of side surfaces to long side surfaces of the bare cell, wherein the frame is an all-in-one type in which the front surface, the pair of side surfaces, and the extending surfaces are integrally formed;

wherein the side surfaces of the frame include:

a first side surface corresponding to the first short side surface of the bare cell, the first side surface of the frame including a first protrusion part at an end of an interior portion thereof, the first protrusion part directly contacting the first short side surface of the bare cell and having a width equivalent to a width of the first short side surface; and a second side surface corresponding to the second short side surface of the bare cell, the second side surface of the frame including a second protrusion part an end of an interior portion thereof, the second protrusion part directly contacting the second short side surface of the bare cell and having a width equivalent to a width of the second short side surface; and wherein:

an extending surface extending from the end of the interior portion of the first side surface defines a space in the end of the interior portion of the first side surface, the first protrusion part at the end of the interior portion of the first side surface filling the space in the end of the interior portion of the first side surface, and an extending surface extending the end of the interior portion of the second side surface defines a space in the end of the interior portion of the second side surface, the second protrusion part at the end of the interior portion of the second side surface filling the space in the end portion of the second side surface.

* * * * *